US008301175B2

(12) United States Patent
Papadimitriou et al.

(10) Patent No.: US 8,301,175 B2
(45) Date of Patent: Oct. 30, 2012

(54) METHOD AND TELECOMMUNICATIONS SYSTEM FOR CONTROLLING PAGING FLOW IN A NETWORK FOR CELLULAR COMMUNICATIONS

(75) Inventors: Dimitris Papadimitriou, Pallini (GR); Enrico De Luca, Caserta (IT); Angelo Ciriaco, Vico Equesnse (IT)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1380 days.

(21) Appl. No.: 10/596,679

(22) PCT Filed: Dec. 20, 2004

(86) PCT No.: PCT/EP2004/053621
§ 371 (c)(1),
(2), (4) Date: Mar. 12, 2007

(87) PCT Pub. No.: WO2005/062649
PCT Pub. Date: Jul. 7, 2005

(65) Prior Publication Data
US 2007/0293213 A1 Dec. 20, 2007

(30) Foreign Application Priority Data
Dec. 22, 2003 (EP) .................................. 03029277

(51) Int. Cl.
*H04W 68/00* (2009.01)
(52) U.S. Cl. ........ 455/458; 455/459; 455/466; 455/515; 455/426.1
(58) Field of Classification Search .................. 455/433, 455/458, 459, 515, 550.1, 41, 426.1, 466
See application file for complete search history.

(56) References Cited

U.S. PATENT DOCUMENTS

| 6,275,708 | B1 * | 8/2001 | Lahtinen ........................ 455/458 |
| 2002/0171581 | A1 * | 11/2002 | Sheynblat et al. ........ 342/357.09 |
| 2006/0128395 | A1 * | 6/2006 | Muhonen .................... 455/456.1 |

FOREIGN PATENT DOCUMENTS

| GB | 2350918 A | * 12/2000 |
| WO | WO 00/78061 A | 12/2000 |
| WO | WO 01/89256 A | 11/2001 |

OTHER PUBLICATIONS

Christopher Redding; Carol-Lyn Taylor: Priority Access Service in Cellular and PCS networks: ITS Conference Papers, IEEE Military Communications Conference 2001, 'Online! Oct. 28, 2001-Oct. 31, 2001 p. 1-5, XP002278986 Retrieved from the Internet: URL:http://its.bidrdoc.gov/home/conferences/attended/milcom/282.pdf retrieved on May 5, 2004! p. 2, left-hand col., line 38-p. 5, left-hand col., line 28 table 1 figure 1.

* cited by examiner

*Primary Examiner* — Kathy Wang-Hurst

(57) ABSTRACT

A method of controlling paging flow in a network for cellular communications is described, which comprises the steps of: at a control node, receiving a request for paging a mobile station; determining a location area in which the paging shall be performed; checking whether the number of paging transactions which are ongoing for the location area is lower than at least one maximum number of ongoing paging transactions allowed for the location area; after a determination that the number of ongoing paging transactions is lower than the maximum number, updating the number of ongoing paging transactions for the location area and processing the paging request. Preferably, if the number of ongoing paging transactions is not lower than the maximum number, it is checked whether the paging request is a particular LCS transaction and, if so, the request is placed in a buffer and served with priority as soon as the number of ongoing paging transactions returns to be lower than the maximum number.

18 Claims, 5 Drawing Sheets

METHOD AND TELECOMMUNICATIONS SYSTEM FOR CONTROLLING PAGING FLOW IN A NETWORK FOR CELLULAR COMMUNICATIONS

FIELD OF THE INVENTION

The present invention relates to a method and telecommunications system for controlling paging flow in a network for cellular communications.

BACKGROUND OF THE INVENTION

In a network for cellular communications, the geographical area of coverage for mobile communications is subdivided into smaller areas, either logical areas or physical areas. In particular, a geographical area comprises cells and location areas.

A cell is an area in which a user can communicate with a certain base station. A location area is an area comprising a plurality of cells and it is associated with a Visitor Location Register (VLR), which stores data about all customers who are roaming within the corresponding location area.

FIG. 1 shows an example of arrangement of such areas, in which tree location areas 11a, 11b and 11c are associated to respective Mobile Services Switching Centers (MSCs) 14a, 14b and 14c and in which each location area comprises a plurality of cells 12. In the figure, the areas fit complementarily with each other for the sake of simplicity, but it is clear that other arrangements known to the skilled in the art may be provided.

If an incoming transaction directed to a certain Mobile Station (MS) is received in the network (e.g. a call by another party), in order to locate the mobile station a paging request is sent to all the base stations in the location area in which the "target" mobile station is registered. When the mobile station discovers that it is being paged, a channel on the radio interface is activated, the mobile station sends a page response indicating that it has been paged and that the network can locate it.

In a location area, a great number of mobile stations is present, and the number of paging requests/responses transmitted in that location area increases with the number of mobile stations within the location area.

The increasing proliferation of mobile stations, due to the great convenience of mobile communications and the growth of additional services provided by the operators, may cause congestion in the network. In fact, the number of the available radio resources is limited and the network congestion is a drawback the operator should avoid in order not to offer services which cannot be duly handled by the network.

Moreover, requests concerning services of prime importance such as positioning request in case of emergency or law enforcement may not be served in case of congestion, this being an unacceptable drawback that greatly reduces the advantages of Location Services.

The same problem affects Location Services transactions deriving from a request for last known location of the target mobile station. Such information is usually stored at the Mobile Services Switching Center and accordingly it is straightforward for the Mobile Services Switching Center to handle such request. Again, a congestion make such a simple request unduly complicated to handle.

These drawbacks are not only unacceptable per se for a modern mobile network but they also imply important loss of profit and disadvantages both for the operator, since the subscribers are not encouraged in taking advantage of their services, and for the subscribers, who deny themselves of useful services in which they may enroll if such services appeared to be more efficient.

At present, a mechanism for controlling the influx of calls per location area is known and it used for Call Control (CC) transactions only. In fact, for CC transactions, before the paging is ordered, a Roaming Number is allocated through which the call is routed from the Gateway Mobile Services Switching Center receiving the incoming call to the MSC/VLR associated with the location area of the target mobile station. The known mechanism consists in defining (at the operator side) how many roaming number allocations will be permitted for a specific location area at the same time.

However no such mechanism is known for allowing the operator to control the paging flow of other transactions, such as Supplementary Services (SS), Short Message Services (SMS) and LoCation Services (LCS) transactions.

In fact, when a SS, SMS or LCS transaction is received at the MSC/VLR, a paging is ordered and the only way to control the amount of requested paging may be on network level by controlling the file size of the software that controls the paging mechanism. This handling is however inefficient, because it does not take into account the configuration of the network, in which different location areas have different radio-resource capacities.

In addition, this mechanism cannot protect the radio network from congestion when bursts of paging requests are destined to the same location area, for example when an important athletics event or football match takes place in a stadium.

SUMMARY OF THE INVENTION

Aim of the present invention is to overcome the above mentioned drawbacks, particularly by providing a method and a telecommunications system which controls the paging flow at a service node in a more robust way.

Within the scope of this aim, a particular object of the invention is to meet the requirements for either the mobile subscriber, the service provider and the operator.

Another object is to prioritize services which are of most importance with respect to the resource allocation of the system.

This aim, these objects and other which will become apparent from the following description are achieved by a method of controlling paging flow in a network for cellular communications characterized in that it comprises the steps of: at a control node, receiving a request for paging a mobile station, determining a location area in which the paging shall be performed; checking whether the number of paging transactions which are ongoing for the location area is lower than at least one maximum number of ongoing paging transactions allowed for the location area; after a determination that the number of ongoing paging transactions is lower than the maximum number, updating the number of ongoing paging transactions for the location area and processing the paging request.

According to a particular aspect of the present invention, a checking is performed so as to determine whether the incoming request is related to a Location Service. According to another aspect of the present invention, which can be alternative or parallel to the former one, checking is performed so as to determine whether the incoming request is of a particular kind, for example a kind which is profitable either for the operator or the subscribers within a location area, and which can be prioritized accordingly.

The aim and the objects of the present invention are also achieved by a telecommunications system for controlling a paging flow in a network for cellular communications comprising at least one control node associated with a location area serving a mobile station to be paged, the control node comprising means for receiving paging requests, characterized in that the system comprises: memory means for storing at least one maximum number of ongoing paging transactions allowed for the location area and for storing the number of ongoing paging transactions; comparing means for checking whether the number of ongoing paging transactions is lower than the at least one maximum number, paging means for paging the mobile station in response to an outcome of the comparing means.

Advantageously, the telecommunications system comprises Location Services Request determining means for determining whether a paging request received by the control node derives from a Location Services request, which means are preferably set so as to check whether the Location Services request is a request for last known location of the mobile station.

Alternatively or additionally, the Location Services Request determining means are set so as to check whether the Location Services request comes from an Emergency Center or a Law Enforcement Agency.

Preferably, the control node comprises buffer means for temporarily storing said paging request if the Location request is a request coming from an Emergency Center or from a Law Enforcement Agency, the paging means being set so as to serve the paging request with priority.

According to an embodiment of the invention, only one maximum number is defined which is representative of the overall number of ongoing paging transactions for the particular location area, regardless of the kind of transaction.

According to another embodiment of the present invention, more than one maximum number is defined for the same location area. In particular, a respective maximum number of permitted ongoing paging transactions is defined for each kind of transaction.

According to yet another embodiment of the present invention, two maximum numbers are defined at the control node, namely a first maximum number representative of the maximum number of allowed ongoing CC, SS, SMS paging transactions, and a second maximum number indicative of the maximum number of allowed ongoing LCS transactions.

BRIEF DESCRIPTION OF THE DRAWINGS

Further characteristics and advantages of the invention will become better apparent from the following description of preferred but not exclusive embodiments of the method and the telecommunications system for controlling paging flow, illustrated by way of non-limitative embodiments in the accompanying drawings, wherein.

DETAILED DESCRIPTION OF THE REFERRED EMBODIMENTS

Figure 1:
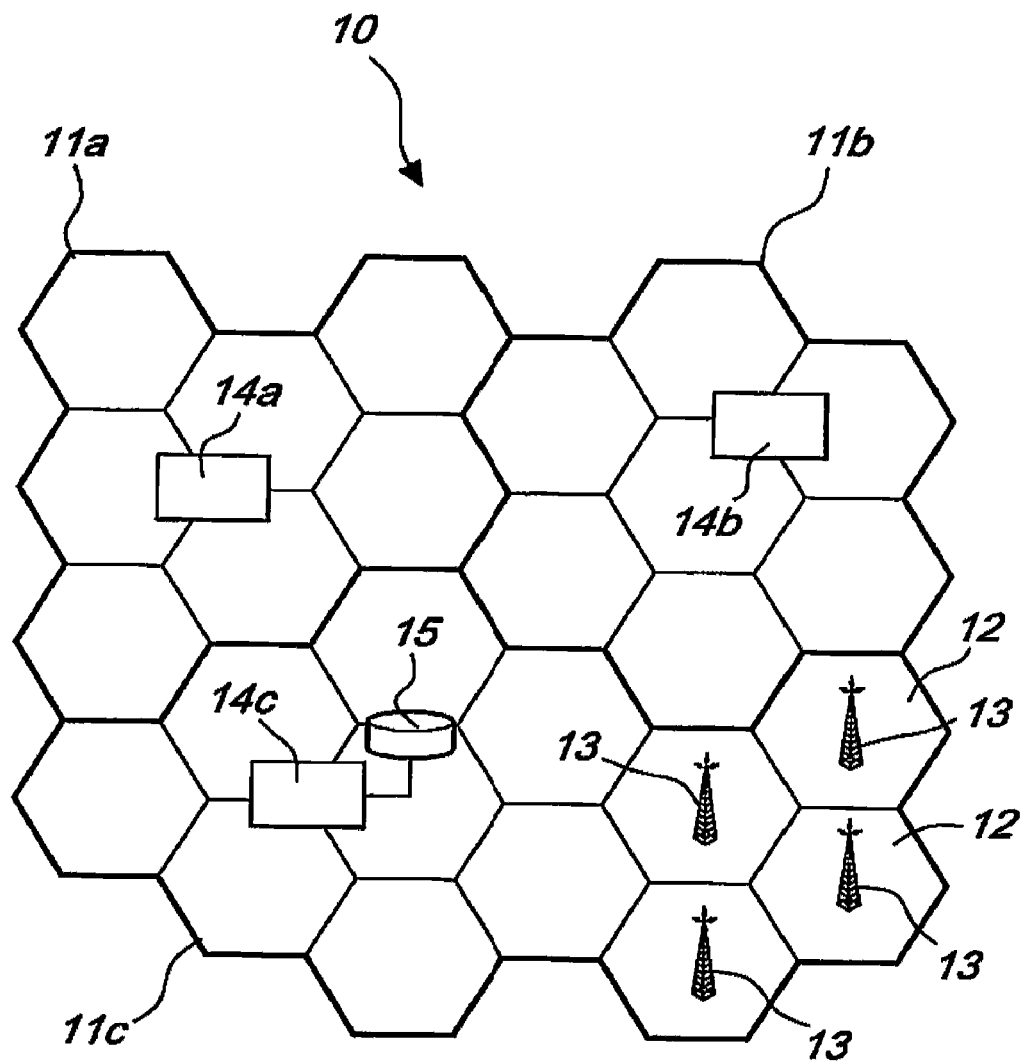
FIG. 1 is a block diagram of a conventional cellular network.

As anticipated above, with reference to FIG. 1, a typical GSM network 10 comprises a plurality of cells 12, which are associated with at least one Base Station 13, schematically represented by a tower antenna, and which are grouped so as to form location areas 11a, 11b and 11c associated with a geographical zone. Such location areas are served by a respective Visitor Location Register (VLR), for instance VLR 15, which is preferably comprised or connected to at least one control node, in particular at least one Mobile Services Switching Center (MSC) 14a, 14b and 14c (MSC/VLR).

The basic function of MSC/VLR is to switch speech and data connections between Base Station Controllers (BSCs), other MSCs, other networks and external non-mobile networks. The MSC also handles a number of functions associated with mobile subscribers, among others registration, location updating and handover between a user equipment and the Public Land Mobile Network (PLMN).

The VLR stores data about all customers who are roaming within the location area of the corresponding MSC. This data is updated through a location update procedure initiated from the mobile station via the MSC, or directly from the subscriber's Home Location Register (HLR) or Home Subscriber Server (HSS).

The HLR/HSS is the home register of the subscriber, which particularly stores information about the subscription, the services which are allowed to the subscriber and the subscriber's location. When the subscriber roams into the location area of an MSC different from the home MSC, the HLR/HSS is updated accordingly.

It is clear to the skilled in the art that the control node of the network can be a SGSN support node, should the network be a GPRS network.

Figure 2:
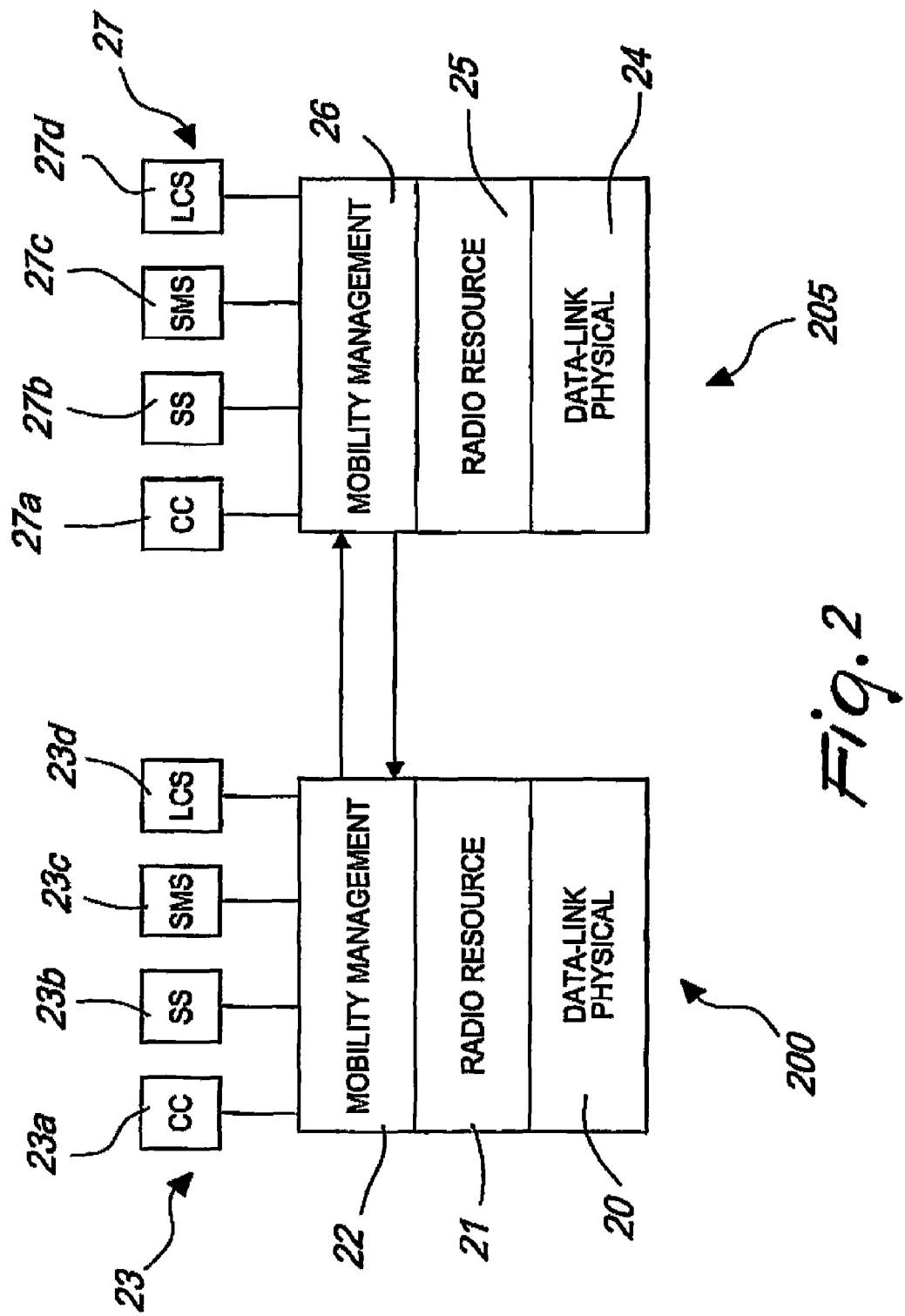
FIG. 2 is a block diagram of the layered structure of GSM/UMTS.

It is known that the GSM/UMTS system can be illustrated as comprising a number of functional layers hierarchically arranged, as shown in FIG. 2. Such layers can be defined for both the MSC (layers 200) and the mobile station (layers 205).

A first layer (20, 24) comprises the physical layer, which represents the physical means for interfacing the various devices of the network, and the data-link layer, which provides data link services and functionality.

A second layer is the so-called Radio Interface layer, and it comprises three sub-layers: a Radio Resource (RR) management sub-layer (21, 25), a Mobility Management (MM) sub-layer (22, 26) and a Connection Management (CM) sub-layer (23, 27).

The RR sub-layer 21 is responsible for channel handling. The MM sub-layer 22, handles together with CM sub-layer 23 various transaction types, in particular Call Control transactions (CC layer 23a, 27a), Supplementary Services transactions (SS layer 23b, 27b), Short Message Service transactions (SMS layer 23c, 27c) and LoCation Services transactions (LCS layer 23d, 27d).

For each location area, a plurality of such call-related or services-related transactions may arrive at the MSC/VLR. According to the invention, at least one maximum number of allowed paging transactions is defined for each location area.

According to an embodiment of the invention, only one maximum number is defined which is representative of the overall number of ongoing paging transactions for the particular location area, regardless of the kind of transaction, i.e. regardless of whether the incoming paging request regards CC, SS, SMS or LCS transactions.

Such maximum number is stored in memory means which, in a preferred embodiment, are provided within the VLR of the location area. Alternatively, the memory means are an integral part of the MSC of the same location area or they are located in other entities which can be accessed by the MSC/VLR.

According to another embodiment of the present invention, more than one maximum number is defined for the same location area. In particular, a respective maximum number of permitted ongoing paging transactions is defined for each kind of transaction.

According to another embodiment of the present invention, two maximum numbers are defined at the MSC/VLR, namely a first maximum number representative of the maximum number of allowed ongoing CC, SS, SMS paging transactions, and a second maximum number indicative of the maximum number of allowed ongoing LCS transactions.

The skilled in the art will not have any difficulty in defining other groupings of kind of transactions for which a maximum number can be defined. Such groupings can be defined in order to meet the operator requirements, for example in order to allocate more resources to the type of traffic which is preferred by an operator.

According to the amount of maximum numbers defined for a location area, one or more counters are preferably provided for registering and updating the current number of ongoing transactions. Such counters are preferably located at the MSC, but they may be located at other entities accessible by the MSC in the location area.

Figure 3:
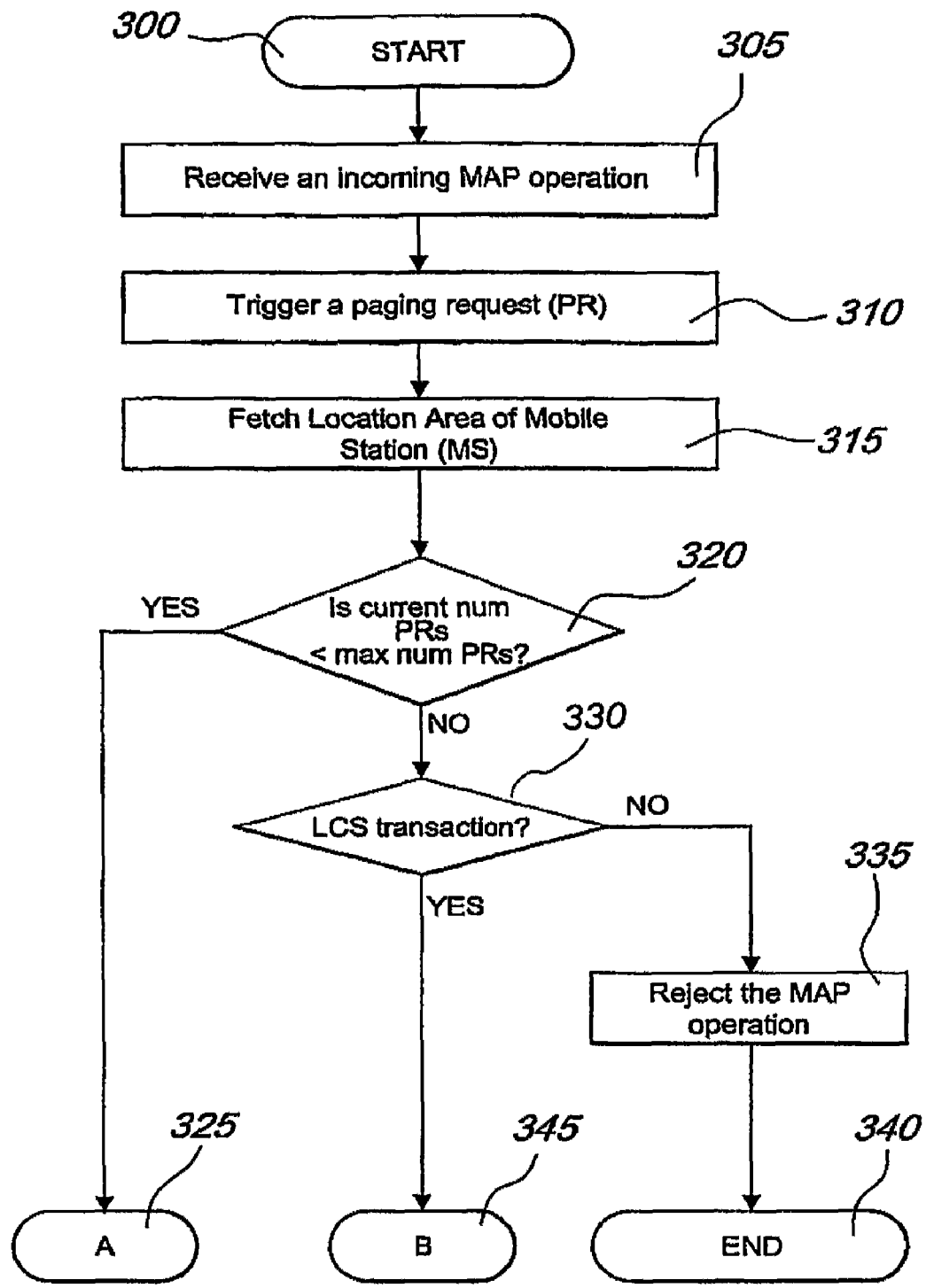
FIG. 3 is a flow diagram illustrating steps of a paging flow control method according to the invention.

With reference to FIG. 3, a flow chart is depicted illustrating the method according to an embodiment of the invention in which a maximum number indicative of the overall number of allowed parallel transactions is defined at the MSC/VLR.

At step 300 the procedure is initiated by a transaction sent by any of the users of the Mobility Management sub-layer, which orders paging for reaching a target mobile station (MS).

At step 305 the request is received at the MSC/VLR, in the form of a MAP operation which, for example, may be one of the following:

MAP_UNSTRUCTURED_SS_REQUEST, MAP_UNSTRUCTURED_SS_NOTIFY, MAP_MT_FORWARD_SHORT_MESSAGE, MAP_PROVIDE_SUBSCRIBER_LOCATION, MAP_PROVIDE_ROAMING_NUMBER.

At step 310 paging is triggered by the received MAP operation. If the MAP operation is a MAP_PROVIDE_ROAMING_NUMBER operation, then it might not trigger immediately a paging request. However, the paging request is sent as soon as the Initial Address Message (IAM) is received from the Gateway Mobile Services Switching Center (GMSC).

At step 315 the Location Area (LA) where the subscriber is currently roaming is fetched from the VLR 15.

At step 320 it is checked whether the number of paging transactions which are ongoing for the location area determined at stop 315 is lower than at least one maximum number of ongoing paging transactions allowed for the LA. The number of ongoing paging transactions is preferably kept by a counter at the MSC as indicated herein above.

Figure 4:
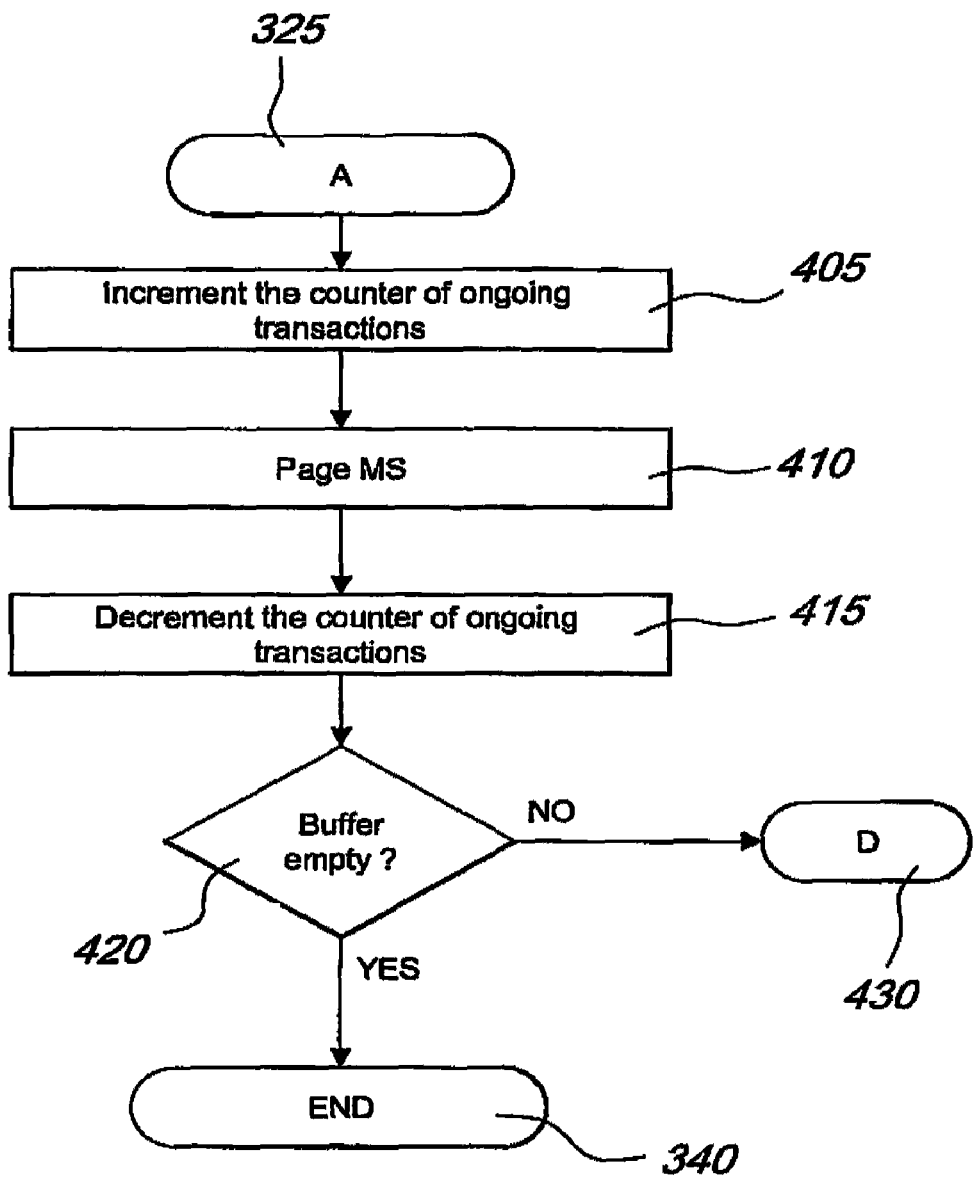
FIG. 4 is a flow diagram connected to the diagram of FIG. 3 illustrating a particular paging process according to the invention.

If the maximum number of allowed paging transactions has not been reached at step 320, the paging request is substantially accepted by the MSC and the procedure jumps to step 325, as illustrated in FIG. 4.

In particular, at step 405 the counter of ongoing transactions is incremented so as to take into account the newly accepted paging request. Then, at step 410, the mobile station is paged, i.e. the paging request is sent to the Base Station Controller and then the paging response message is received from the mobile station.

After receiving the paging response message, the counter is decremented at step 415.

Then, at step 420, it is checked whether previous LCS requests are still pending, by controlling the status of buffer means which will be described hereinafter. If so, the procedure jumps to step 430 and one pending LCS request is served, starting from step 530 as it will be described with reference to FIG. 5.

Otherwise, if no previous LCS request is pending or if the buffer means are empty, the system returns in a waiting mode at step 340, i.e. it is available to receive new MAP operations.

If the maximum number of allowed paging transactions has been reached or exceeded at step 320, then a further check is performed at step 330 in order to check whether the MAP operation comes from the LCS layer.

If not, at step 335 the MAP operation is rejected, an error code is returned indicating resource limitation, and the procedure ends at step 340.

Figure 5:
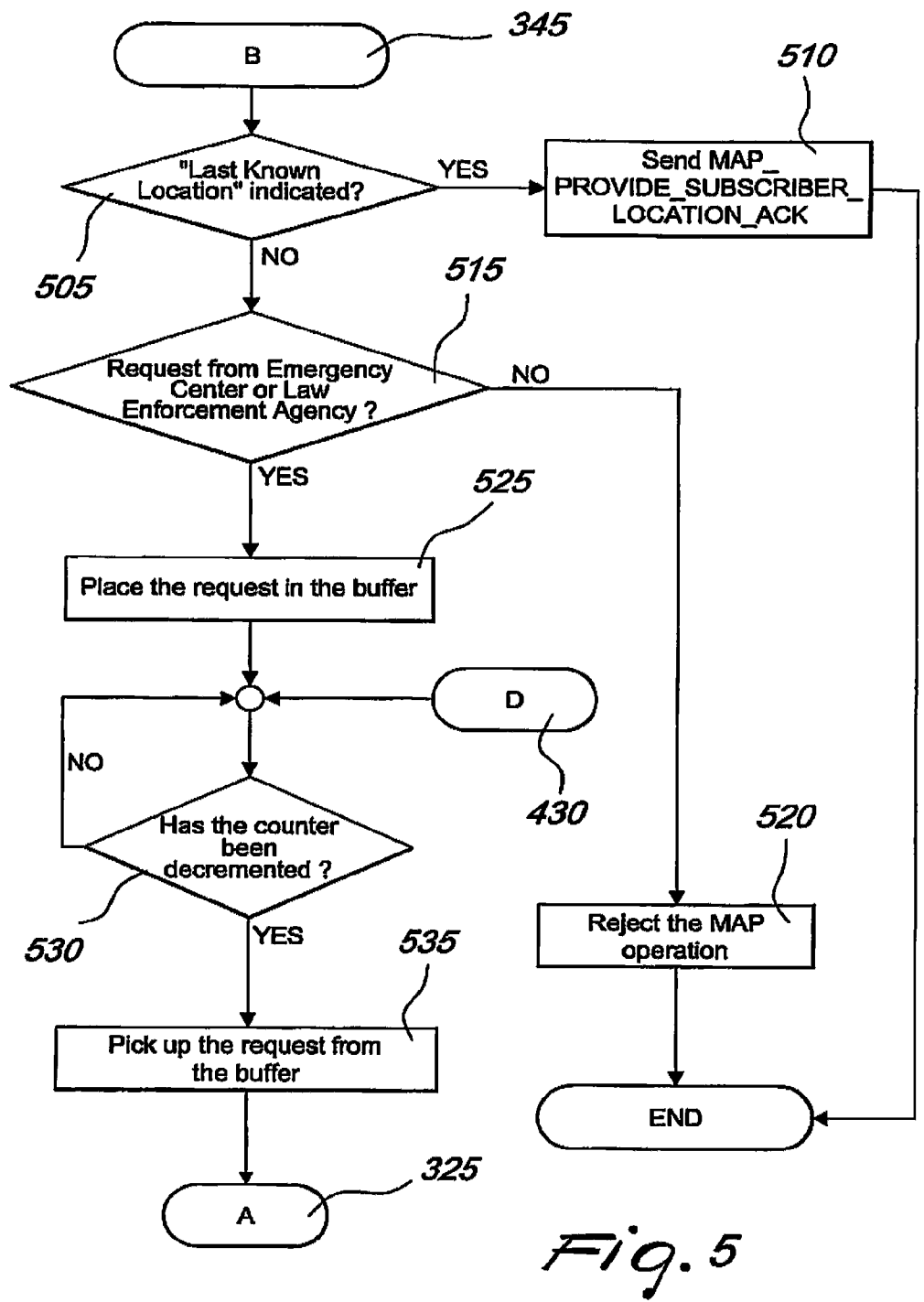
FIG. 5 is a flow diagram connected to the diagram of FIG. 3 illustrating the management of LCS transactions according to a preferred embodiment of the invention.

Otherwise, if it is determined that the MAP operation does come from the LCS layer at stop 330, the procedure jumps to stop 345, as illustrated in FIG. 5.

At step 505, it is checked whether the incoming LCS operation indicates that a 'Last Known Location' would be acceptable for the requesting entity. If so, at step 510 the Last Known Location information is retrieved from the VLR and then returned with the MAP_PROVIDE_SUBSCRIBER_LOCATION_ACK message. At step 340 the procedure is ended.

If, at step 505, it is determined that no 'Last Known Location' is indicated in the LCS operation, then at step 515 it is checked whether the LCS operation is coming from an emergency center or a law enforcement agency or from entities of equivalent importance. In an alternative embodiment, not shown in the figures, such step is performed directly after step 330 and before the step of determining whether 'Last Known Location' is indicated in the LCS operation. The outcome of these checking steps will be substantially the same as those of FIG. 5.

Returning to the exemplary embodiment illustrated in FIG. 5, if it is determined that the LCS operation is not coming from an emergency center or a law enforcement agency, the MAP operation is rejected at step 520 with a 'Resource Limitation' error code and the procedure ends at step 340.

Otherwise, at step 525 the request is put in a buffer which is preferably within the MSC. This buffer accordingly stores such particular kind of LCS requests, and it is preferably used for performing the above mentioned checking at step 420.

At step 530 it is checked whether at least one paging request has been finalized, for example by checking whether the counter has been decremented with respect to the previous check (at step 320 or at step 530 itself). Step 530 is also reached by the above described step 430.

The checking at step 530 is repeated until it is verified that the number of ongoing paging transactions has become lower than the maximum number of allowed ongoing transactions. As soon as this condition is met, the request is picked up from the buffer at step 535 and the LCS operation is served with priority, before any other current incoming transaction, by jumping to the above-described step 325. It is clear to the skilled in the art that the above described exemplary embodiment may be easily modified without departing from the scope of the invention. In particular, if several maximum numbers are defined by the operator in order to differentiate and manage different kinds of transactions, the procedure described with reference to FIGS. 3 and 4 is performed for each kind of transaction, while the procedure described with reference to FIG. 5 is preferably performed for LCS transactions only.

The skilled in the art easily understands that the above described steps may be performed by any computer hardware and/or software and telecommunications means programmed through conventional techniques in order to take into account the additional information data needed by the present invention. A combination of processor, memory and communication means is required in order to receive and process the requests, together with checking and determining means, preferably implemented through software, for determining the availability of resources and/or the kind of requests according to the invention.

The invention is therefore preferably implemented by introducing new functionality in existing systems, through conventional techniques which are clearly in the reach of the average technician and, therefore, are not hereby discussed in detail.

It has thus been shown that the present invention fulfils the proposed aim and objects. In particular, it is seen that both mobile subscribers and the service provider may benefit of important services, like positioning due to emergency requests, which are always processed and prioritized. From the operator's point of view, it is seen that the operator can avoid congestion and flexibly allocate resources so as to adapt to the evolution of the radio network. Moreover, management of paging transactions can be customized, for example, in order to prioritize operations with higher costs on the resource allocation of the system, this resulting more profitable.

Clearly, several modifications will be apparent to and can be readily made by the skilled in the art without departing from the scope of the present invention. Therefore, the scope of the claims shall not be limited by the illustrations or the preferred embodiments given in the description in the form of examples, but rather the claims shall encompass all of the features of patentable novelty that reside in the present invention, including all the features that would be treated as equivalents by the skilled in the art.

Where technical features mentioned in any claim are followed by reference signs, those reference signs have been included for the sole purpose of increasing the intelligibility of the claims and, accordingly, such reference signs do not have any limiting effect on the interpretation of each element identified by way of example by such reference signs.

The invention claimed is:

1. A method of controlling paging flow in a network for cellular communications, comprising the steps of
   at a control node, receiving a request for paging a mobile station;
   determining a location area in which the paging shall be performed;
   checking whether the number of ongoing paging transactions for the location area is lower than at least one maximum number of ongoing paging transactions allowed for the location area, wherein the paging transactions are of at least one kind selected from the group consisting of Call Control transactions, Supplementary Services transactions, Short Message Service transactions and Location Services transactions, wherein each kind of paging transaction is associated with a respective maximum number;
   after a determination that the number of ongoing paging transactions is lower than the respective maximum number, updating the number of ongoing paging transactions for the location area and processing the paging request;
   wherein the respective maximum number which is allowed for the location area is defined for paging transactions of each of the kind comprising Call Control transactions, Supplementary Services transactions, Short Message Service transactions and Location Services transactions, respectively, the checking step being performed for each kind of paging transaction; and
   after a determination that the number of ongoing paging transactions is not lower than the respective maximum number, checking whether the paging request is a particular LoCation Services (LCS) transaction, and, if so, the request is placed in a buffer and served with priority as soon as the number of ongoing paging transaction returns to be lower than the respective maximum number.

2. The method of claim 1, further comprising the step of after a determination that the number of ongoing paging transactions is higher than or equal to the maximum number, checking whether the paging request derives from a Location Services request.

3. The method of claim 2, further comprising the step of checking whether the Location Services request is a request for last known location of the mobile station.

4. The method of claim 3, further comprising the step of checking whether the Location Service request comes from an Emergency Center or a Law Enforcement Agency.

5. The method of claim 4, further comprising the step of, after a determination that the Location Services request comes from an Emergency Center or a Law Enforcement Agency, serving the paging request with priority.

6. The method of claim 3, further comprising the step of retrieving information on the last known location from a Visitor Location Register.

7. The method of claim 1, wherein the control node is a Mobile services Switching Center or a serving General Packet Radio Services support node.

8. A telecommunications system for controlling a paging flow in a network for cellular communications having at least one control node associated with a location area serving a mobile station to be paged, the system comprising:
   a control node, receiving a request for paging a mobile station, further comprising a memory means for storing at least one maximum number of ongoing paging transactions allowed for the location area and for storing the number of ongoing paging transactions, wherein the paging transactions are of at least one kind selected from the group consisting of Call Control transactions, Supplementary Services transactions, Short Message Service transactions and Location Services transactions, wherein the memory means comprises stored therein respective maximum numbers indicative of a respective maximum number of allowed ongoing paging Call Control transactions, Supplementary Services transactions, Short Message Service transactions and Location Service transactions;
   a comparing means for checking whether the number of ongoing paging transactions is lower than the respective maximum number, wherein the checking is performed for each of the Call Control transactions, Supplementary Services transactions, Short Message Service transactions and Location Service transactions, respectively, and after a determination that the number of ongoing paging transactions is not lower than the respective maximum number the comparing means checks whether the paging request is a particular LoCation Services (LCS) transaction, and, if so, the comparing means places the paging request in a buffer and served with priority as soon as the number of ongoing paging transactions returns to be lower than the respective maximum number; and a paging means for paging the mobile station in response to an outcome of the comparing means; and at least one counter indicative of the number of ongoing transactions, the at least one counter being incremented when the paging request is accepted for processing by the control node and being decremented when a paging response has been returned by the mobile station.

9. The telecommunications system of claim 8, further comprising a Location Services Request determining means for determining whether a paging request received by the control node derives from a Location Services request.

10. The telecommunications system of claim 9, wherein the Location Services Request determining means are set so as to check whether the Location Services request is a request for last known location of the mobile station.

11. The telecommunications system of claim 9, wherein the Location Services Request determining means are set so as to check whether the Location Services request comes from an Emergency Center or a Law Enforcement Agency.

12. The telecommunications system of claim 11, wherein the control nodes comprises buffer means for temporarily storing the paging request if the Location request is a request coming from an Emergency Center or from a Law Enforcement Agency, the paging means being set so as to serve the paging request with priority.

13. The telecommunications system of claim 8, wherein the memory means are comprised in any one of the Mobile Services Switching Center, a Visitor Location Register connected to the Mobile Services Switching Center, a Base Station Controller connected to the Mobile Services Switching Center and serving the location area.

14. The telecommunications system of claim 8 wherein the comparing means are comprised in the control node.

15. The telecommunications system of claim 8 wherein the paging means further comprises a Mobile Services Switching Center and a Base Station Controller serving the location area.

16. The telecommunications system of claim 8, wherein the number of ongoing paging transactions is the overall number of ongoing transactions, regardless of the kind of transaction.

17. The telecommunications system of claim 8, wherein the control node is a mobile services switching center or a serving general packet radio services support node.

18. The method of claim 1, wherein the updating step further comprises the step of incrementing at least one counter indicative of the number of ongoing transactions which is comprised in the control node when a paging request is accepted for processing by the control node, and the step of decrementing the at least one counter when the paging response has been returned by the mobile station.

* * * * *

UNITED STATES PATENT AND TRADEMARK OFFICE
CERTIFICATE OF CORRECTION

| | | |
|---|---|---|
| PATENT NO. | : 8,301,175 B2 | Page 1 of 1 |
| APPLICATION NO. | : 10/596679 | |
| DATED | : October 30, 2012 | |
| INVENTOR(S) | : Papadimitriou et al. | |

It is certified that error appears in the above-identified patent and that said Letters Patent is hereby corrected as shown below:

In Column 5, Line 54, delete "stop" and insert -- step --, therefor.

In Column 6, Line 20, delete "stop 330," and insert -- step 330, --, therefor.

In Column 6, Line 21, delete "stop 345," and insert -- step 345, --, therefor.

In Column 7, Line 46, in Claim 1, delete "steps of" and insert -- steps of: --, therefor.

Signed and Sealed this
Fifth Day of February, 2013

Teresa Stanek Rea
*Acting Director of the United States Patent and Trademark Office*